No. 671,794. Patented Apr. 9, 1901.
B. M. FLETCHER.
APPARATUS FOR THE UTILIZATION OF WAVE POWER.
(Application filed Dec. 29, 1900.)
(No Model.) 2 Sheets—Sheet 1.
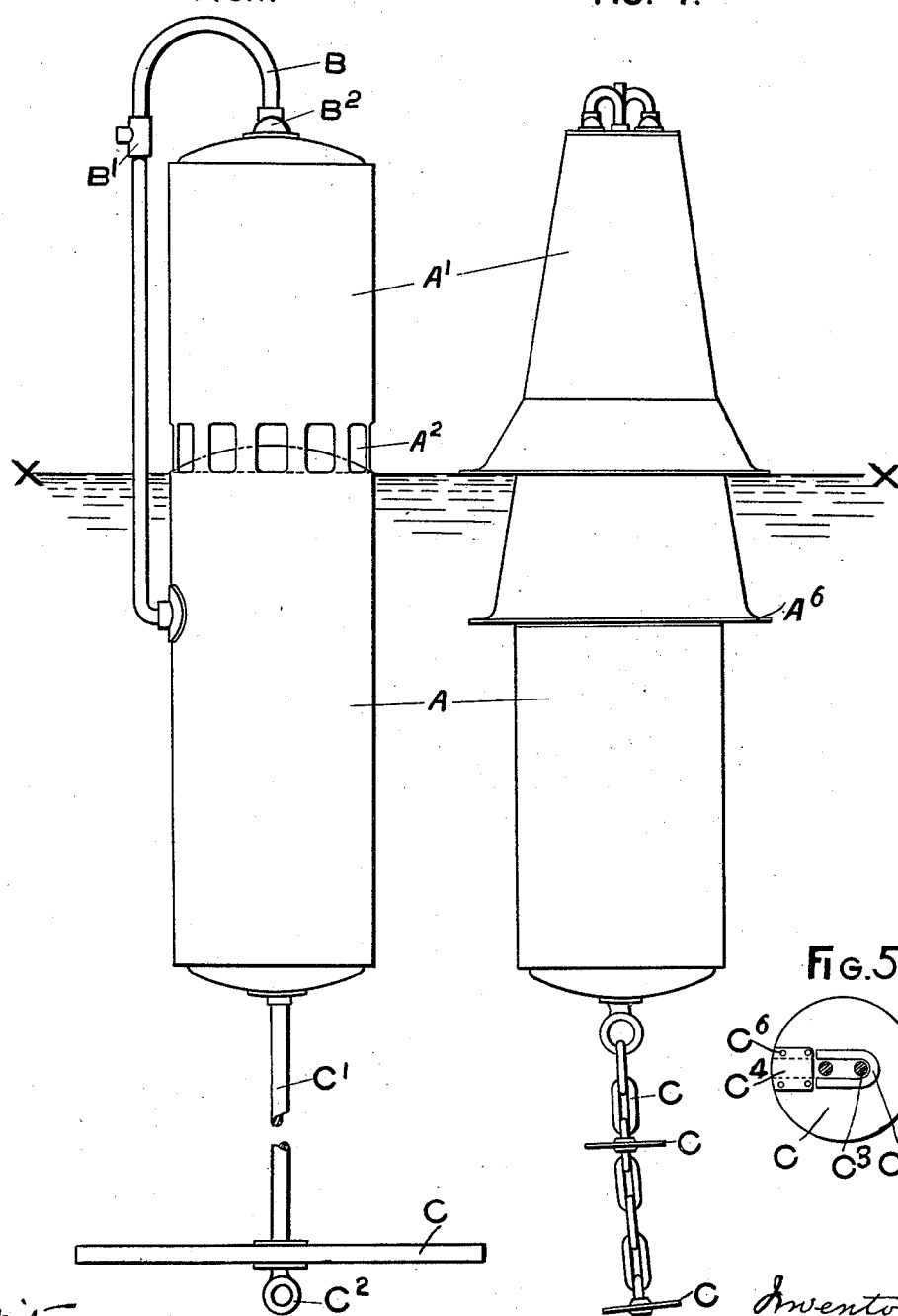

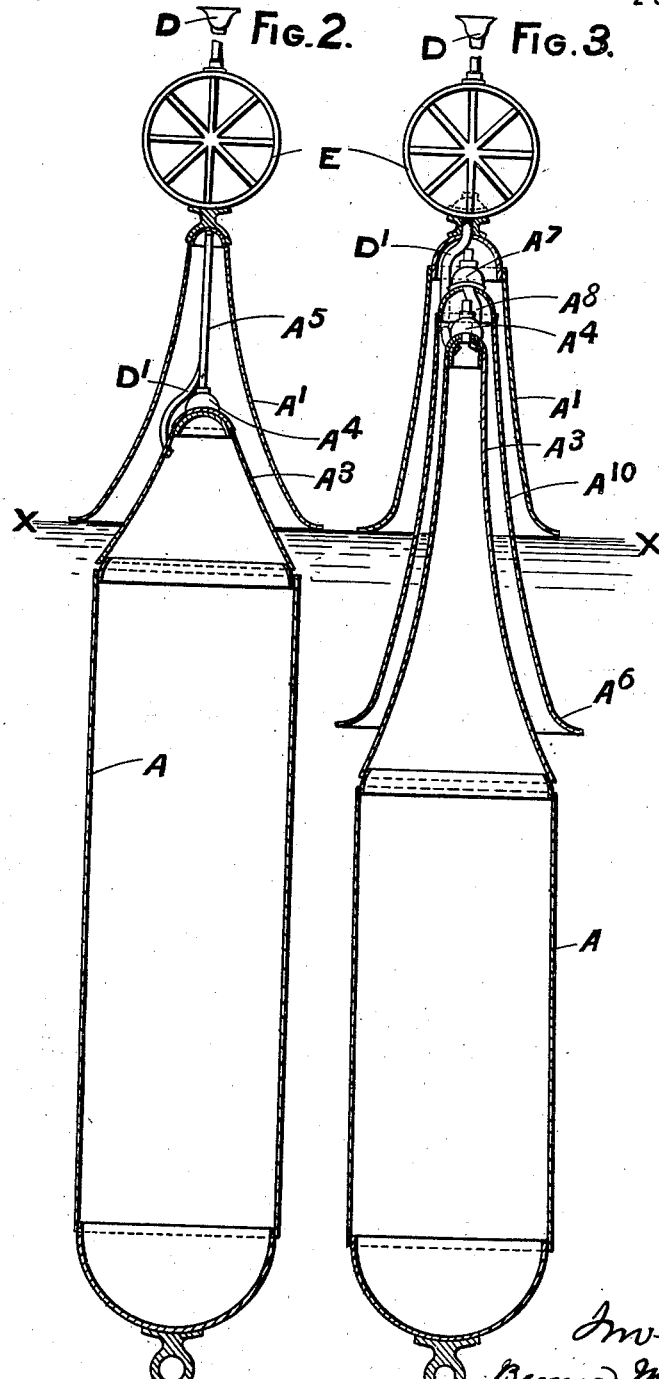

UNITED STATES PATENT OFFICE.

BERNARD MORLEY FLETCHER, OF LONDON, ENGLAND.

APPARATUS FOR THE UTILIZATION OF WAVE-POWER.

SPECIFICATION forming part of Letters Patent No. 671,794, dated April 9, 1901.

Application filed December 29, 1900. Serial No. 41,515. (No model.)

*To all whom it may concern:*

Be it known that I, BERNARD MORLEY FLETCHER, a subject of the Queen of England, residing at London, England, have invented certain new and useful Improvements in or Relating to Apparatus for the Utilization of Wave-Power, (for which application has been made in Great Britain, under No. 5,465, dated March 22, 1900,) of which the following is a specification.

This invention relates to apparatus for the utilization of wave-power and may be carried out in the following manner:

In a simple form the apparatus comprises a cylinder relatively long in proportion to its diameter and divided into two parts, the lower one forming a float or flotation portion which is not intended to rise and fall as do the waves, although it may adjust itself to a change of level, due, for example, to the rise and fall of the tide, and may even oscillate vertically to a limited extent. The second portion, which is intended to be above the water-level, is used as a means of compressing air by the direct action of the water as a piston, the air being taken away and applied as required. In a very simple form the cylinder would be constructed as above described, the lower portion of the upper part being formed with openings through which the water can enter and the upper part having a branch from which the air can pass to any suitable reservoir fixed in any suitable place. The reservoir may be a separate structure on land or secured beneath the surface of the water. A portion of the compressed air may be conducted to the lower part of the cylinder, which may be used as a supplementary reservoir, or in some cases the lower portion of the cylinder may form the only reservoir employed.

Where the wave-power device is used as an automatic signal, the lower or float portion of the cylinder is preferably used as the air-reservoir and may carry a horn or other sounding device, to which air under pressure from the cylinder is admitted for the purpose of signaling. Where it is desired that the sounding device shall operate intermittently, an air or other motor may be carried by the float and arranged to operate a valve at the required intervals, by which blasts of air may be allowed to pass from the reservoir to the sounding device when the latter is required to operate.

Although it is convenient to use the surface of the water itself rising in the vessel as a piston, yet, if desired, a separate piston may be employed, the water entering underneath it, or a disk rising and falling with the surface may be connected to such a piston. In this case the action of the apparatus will resemble that of an ordinary pump, the piston preferably falling by its own weight.

The apparatus, whether provided with a separate piston or not, may be employed to compress air, pump water, or do other useful work, such as the blowing of a horn or whistle, the production of electric light, &c.

In the accompanying drawings, which illustrate several forms of apparatus, all according to this invention, Figure 1 is an elevation of one construction of wave-power apparatus. Fig. 2 is a central vertical section of another construction. Fig. 3 is a similar view showing a modified form. Fig. 4 is an elevation of another slightly-modified construction, and Fig. 5 is a detail view of a portion of the apparatus shown in Fig. 4.

Like letters indicate like parts throughout the drawings.

The wave-power device shown in Fig. 1 comprises a closed chamber or float A, cylindrical in form, supporting an inverted chamber or vessel A'. The chamber A' is arranged so that its lower open end is in free communication with the atmosphere by means of orifices $A^2$, formed in the supporting sides of the chamber. Secured to the upper closed end of the chamber A' is a pipe B, by means of which the upper end of the chamber A' communicates with the lower chamber or reservoir A. The pipe B is provided with a branch pipe B', which may communicate with another reservoir or direct with any device which is to be operated by means of the air compressed in the chamber A by the operation of the waves, as hereinafter described. The chamber A is arranged to support the chamber A' in such a position relatively to the water-level (indicated at X X) that the bottoms of the orifices $A^2$ are level with the water-line, and the chamber A is provided with a disk C, rigidly secured to it by a connecting-support C', so that the chamber shall not be appreciably displaced vertically by the waves, the area of the disk being sufficiently large to oppose any tendency to vertical displacement. The operation of this device is as follows: The chamber A being maintained comparatively stationary in regard to vertical movement, as described, a wave passing the chamber will cause water to enter the chamber A' through the orifices $A^2$, and as this water rises within the chamber the air formerly contained within the chamber will be forced through the pipe B into the chamber or reservoir A. A non-return valve of any convenient construction is provided in the pipe B, preferably at $B^2$, so that this air is prevented from returning to the chamber A' as the water recedes, and the reservoir A thus becomes charged with air under pressure. This air, compressed by means of the water operating as a piston within the cylinder formed by the chamber A', can be conducted away by the pipe B' to any point at which it is desired to be employed and may be allowed to flow freely through the pipe B' as fast as the mechanism or other device through which it is to pass will permit it, or means may be employed to control its passage through this pipe. If it is desired to use the apparatus as a device for sounding an alarm at sea for the guidance of navigation, a horn or other sounder may be secured direct to the pipe B in any convenient position or connected to the same by means of the pipe B', the horn being placed, if necessary, at a suitable distance from the reservoir A.

If preferred, the chamber A may be used as a float only and not as a reservoir, a separate reservoir being provided either on land or secured beneath the surface of the water, or the chamber A may be used as a reservoir in addition to any such separate reservoir. The float A may be moored by means of the eyebolt $C^2$, secured beneath the disk C, the mooring being only to prevent it from drifting from the point at which it is to operate and not to prevent vertical movement of the float, this being regulated by the disk C, as described above.

Fig. 2 shows a modified form of the reservoir A and chamber A'. The upper part of the chamber A in this construction is made conical, as shown at $A^3$, and the inverted chamber A' is made bell-shaped and supported from the chamber A by any convenient means. (Not shown in the drawings.) The chamber A is provided with a non-return valve at $A^4$, from which extends a pipe or conduit $A^5$, open at its upper end. The conduit $A^5$ extends to the upper chamber A' and conducts the air as it is compressed by the water rising in the chamber down to the reservoir A, the water not rising sufficiently high to enter the conduit. Surmounting the chamber A' is a sounder or alarm device D. The device D may be of any convenient construction and communicates by a pipe D' with the air-reservoir A, so that the air compressed in the chamber A will pass out through the sounder D, causing the latter to give a continuous alarm so long as there is air under pressure within the reservoir. If desired, the passage of the air to the sounder D may be controlled by placing a valve in the pipe D' and providing some simple form of motor operatively connected to the valve, so that it is alternately opened and shut, thus giving intermittent blasts upon the sounder D. This motor forms no part of the present invention; but it may conveniently be a small motor operated by the air compressed by the apparatus and may be contained in the casing E.

In Fig. 2 the lower end of the inverted chamber A' is arranged approximately level with the normal water-line X X; but in Fig. 3 a second chamber $A^{10}$ is employed, arranged concentrically with the first and partly within the same, but extending down below the normal water-level X X, as shown at $A^6$. In this construction the conical upper end $A^3$ of the reservoir A is carried farther into the inverted chamber A', so that the pipe $A^5$ is dispensed with, as may also be done when only one inverted chamber A' is employed, if preferred. The upper end of the reservoir A is provided with a valve $A^4$, as before, which communicates with the interior of the upper end of the second inverted chamber $A^{10}$. A second valve $A^7$ is conveniently mounted upon the upper end of the second inverted chamber $A^{10}$ and within the upper end of the first inverted chamber A', and a pipe or conduit $A^8$ conducts the air when compressed from the interior of the first chamber A' down to the reservoir A. This device allows a higher pressure to be obtained within the chamber A when the waves are running high than is the case when only one inverted chamber is used, as air will then be trapped in both chambers A' and $A^{10}$, the trough between the successive waves falling below the end of the second chamber $A^{10}$. In order that it may not be necessary for the water to actually recede from the bottom of the second chamber $A^{10}$ before air can be admitted to the same, a non-return inlet-valve of any convenient structure may be arranged in the upper end of the chamber communicating either with the interior of the first chamber A' or directly with the external atmosphere. When desired, the air from the first and second chambers A' and $A^{10}$ may be conducted to different reservoirs, so that the air under the higher pressure may be used for one purpose and that of lower pressure for another. For instance, the reservoir A may be divided into two compartments, the air in one compartment under the lower pressure being used to drive the motor in the casing E and that in the other compartment under higher pressure being used to sound the alarm D.

Fig. 4 shows a wave-power device constructed similarly to that shown in Fig. 3, the form of the outer inverted chamber A' being slightly altered. It is obvious that any convenient number of inverted chambers may be used, each extending lower than the one by which it is inclosed, so that portions at different heights of a passing wave may be utilized to compress air. The inverted chambers may also obviously be of any form, the bell-shaped construction being preferred as giving easier access to the water, and thus causing the apparatus to be more effective in its operation. All of the devices desired may be used for any apparatus besides that of sounding an alarm, and any one of them may be used to sound an alarm either continuously or intermittently, the admission of the intermittent blast of air to the sounder being regulated by a motor of the kind described or by any other convenient device. In place of the disk C, secured to a rigid support C', one or more disks C may be secured to the mooring-chain or to a separate chain $C^3$, Fig. 4, suspended from a float A. Disks secured thus to the mooring-chain or a separate chain will prevent the float A from being raised by a passing wave, and vertical movement in a downward direction would not render the device inoperative.

Fig. 5 shows a convenient means for attaching the disks C to a chain. Each disk is provided with a slot $C^4$, which extends from the periphery of the disk to a point beyond its center. That part of the slot near the center of the disk is surrounded by a projecting edge or boss $C^5$. In placing a disk upon the chain the disk is slid onto one of the links, so that the link lies in that part of the slot surrounded by the boss $C^5$, and a plate $C^6$ is then riveted or otherwise secured across the end of the slot nearest the periphery of the disk, so that the link cannot be withdrawn. That portion of the slot nearest the center of the disk is made of such dimensions that the link of the chain cannot turn around in the slot, so that the adjacent links of the chain prevent the disk from moving lengthwise along the chain.

Any of the devices described may be provided with a non-return valve at the upper end of the inverted chamber A' to admit air from the atmosphere to the interior of the chamber as the water recedes from the same, should it be necessary.

In place of a flexible device, such as a chain or cable, for mooring the float A an inextensible rod may be used, if desired, with or without the employment of disks, such as C.

Although the wave-power device described is usually a floating device, it may in some cases be convenient to permanently fix the inverted chamber either upon a rock or by any suitable means from the same floor. In such cases a series of inverted chambers may be arranged at different heights, so that at whatever height the normal level of the water may be (this varying, of course, according to the tides) a sufficient number of the chambers may always be in a proper position relatively to the water-level to render them operative.

It will be understood that where a disk C' is secured to the wave-power device, as shown in Fig. 1, it may be attached by any suitable means other than that shown. For instance, it may be fixed directly upon the bottom of the float or reservoir A or secured to the latter by any convenient arrangement of stays or brackets.

What I claim as my invention, and desire to secure by Letters Patent, is—

1. In apparatus for the utilization of wave-power the combination of a float, a vessel or chamber connected to said float and having an air-outlet in its upper portion, and an opening in its lower portion to allow free access to the water, and means to retain the float and vessel in position so that the opening in the lower portion of the vessel is approximately at the normal water-level, substantially as and for the purpose set forth.

2. In apparatus for the utilization of wave-power, the combination of a float, a vessel or chamber connected to and above the float, said vessel having an air-outlet in its upper portion and an opening in its lower portion to allow free access to the water, means to retain the float and vessel in position so that the opening in the lower portion of the vessel is approximately at the normal water-level, a reservoir, a conduit leading from the air-outlet in the vessel to the reservoir, and a non-return valve in the conduit, substantially as set forth.

3. In apparatus for the utilization of wave-power, the combination of a float, a vessel or chamber connected to said float and having an air-outlet in its upper portion and an opening in its lower portion to allow free access to the water, means to retain the float and vessel in position so that the opening in the lower portion of the vessel is approximately at the normal water-level, a reservoir, a conduit leading from the air-outlet in the vessel to the reservoir, a non-return valve in the conduit, and a conduit leading from the reservoir to a point at which the air within the reservoir is required to operate, substantially as set forth.

4. In apparatus for the utilization of wave-power, a vessel acting as a float and a reservoir for air, an inverted chamber supported above the upper portion of said vessel, an opening in said chamber at approximately the normal water-level to allow free access to the water, a conduit between the inverted chamber and the reservoir, a non-return valve in said conduit, a conduit leading from the reservoir to the point at which the air within said reservoir is required to operate and means tending to prevent the vessel moving vertically relatively to the normal water-level substantially as set forth.

5. In apparatus for the utilization of wave-power, a vessel acting as a float and a reservoir for air, an inverted chamber supported above the upper portion of said vessel, an opening in said chamber at approximately the normal water-level to allow free access to the water, a second inverted chamber supported between the first chamber and the top of the vessel, an opening in the second chamber somewhat below the normal water-level, conduits between the chambers and the reservoir, non-return valves in such conduits, a conduit leading from the reservoir to a point at which the air within the reservoir is required to operate, and means tending to prevent the vessel moving vertically relatively to the normal water-level substantially as set forth.

6. In apparatus for the utilization of wave-power, a vessel acting as a float and a reservoir for air, an inverted chamber supported above the upper portion of said vessel, an opening in said chamber at approximately the normal water-level to allow free access to the water, a second inverted chamber supported between the first chamber and the top of the vessel, an opening in the second chamber somewhat below the normal water-level, non-return air-inlet valves in the inverted chambers, conduits between the chambers and the reservoir, non-return valves in such conduits, a conduit leading from the reservoir to a point at which the air within the reservoir is required to operate, and means tending to prevent the vessel moving vertically relatively to the normal water-level, substantially as set forth.

7. In apparatus for the utilization of wave-power, a vessel acting as a float and a reservoir for air, an inverted chamber supported above the upper portion of said vessel, an opening in said chamber at approximately the normal water-level to allow free access to the water, a second inverted chamber supported between the first chamber and the top of the vessel, an opening in the second chamber somewhat below the normal water-level, non-return air-inlet valves in the inverted chambers, conduits between the chambers and the reservoir, non-return valves in such conduits, a conduit leading from the reservoir to a point at which the air within the reservoir is required to operate, and a disk suspended from the lower end of the floating vessel to prevent the vessel moving vertically relatively to the normal water-level, substantially as set forth.

In testimony whereof I have signed my name to this specification in the presence of two subscribing witnesses.

BERNARD MORLEY FLETCHER.

Witnesses:
ALFRED J. BOULT,
HARRY B. BRIDGE.